(12) United States Patent
Huang

(10) Patent No.: US 7,564,012 B2
(45) Date of Patent: Jul. 21, 2009

(54) METHOD FOR AUTOMATICALLY FOCUSING IN PHOTOGRAPHIC MODULE AND ELECTRONIC DEVICE THEREOF

(75) Inventor: Ing-Jye Huang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 0 days.

(21) Appl. No.: 12/107,084

(22) Filed: Apr. 22, 2008

(65) Prior Publication Data

US 2008/0267602 A1 Oct. 30, 2008

(30) Foreign Application Priority Data

Apr. 27, 2007 (TW) .............................. 96115024 A

(51) Int. Cl.
*G02B 7/04* (2006.01)
*G02B 27/40* (2006.01)
*G02B 27/64* (2006.01)

(52) U.S. Cl. .................................. 250/201.2
(58) Field of Classification Search ............... 250/201.2
See application file for complete search history.

(56) References Cited

U.S. PATENT DOCUMENTS 6,979,808 B2 * 12/2005 Konishi .................. 250/201.2

* cited by examiner

*Primary Examiner*—Seung C Sohn
(74) *Attorney, Agent, or Firm*—Jianq Chyun IP Office

(57) ABSTRACT

A method for automatically focusing in a photographic module is disclosed. The focus action has two stages. In the first stage, a photographic module and a controller electrically connected to the photographic module are provided. When the lens group of the photographic module is provided at the original position, the controller calculates an automatic focus (AF) evaluation value of the photographic module. Then, the lens group moves twice toward the first direction by a first distance, wherein every time the lens group moves, the controller calculates the AF evaluation value of the photographic module. Afterwards, the controller determines via the difference value between two sequential AF evaluation values and controls the moving direction of the lens group according to the determining result.

12 Claims, 4 Drawing Sheets

METHOD FOR AUTOMATICALLY FOCUSING IN PHOTOGRAPHIC MODULE AND ELECTRONIC DEVICE THEREOF

CROSS-REFERENCE TO RELATED APPLICATION

This application claims the priority benefit of Taiwan application serial no. 96115024, filed on Apr. 27, 2007. The entirety the above-mentioned patent application is hereby incorporated by reference herein and made a part of specification.

BACKGROUND OF THE INVENTION

1. Field of the Invention

The invention relates to a method for automatically focusing in a photographic module and the electronic device thereof and, more particularly, to a method for automatically focusing in a photographic module which can focus rapid and accurate and the electronic device using the same.

2. Description of the Related Art

With the progress of the science and technology, a single electronic device with a single function gradually becomes a single electronic device with multiple functions to meet the consumer's demand for convenience.

As for the multi-functionality of a mobile phone, the conventional mobile phone can not only provide the communication function, but also provide functions such as playing games, accessing the Internet, reading electronic books and photographing and so on, wherein the photographing function which can capture instant image is very loved by people. The photographing function of a mobile phone is mainly provided by a photographic module installed in the mobile phone. Generally speaking, the method for automatically focusing in a photographic module is performed as follows. High frequency components are analyzed to calculate an automatic focus (AF) evaluation value first, and then the lens is moved to focus until a greatest AF evaluation value is obtained, and then, the AF is finished.

Specifically, the conventional the method for automatically focusing in a photographic module is performed as follows. In the whole focus range of the photographic module, every time the lens moves a preset distance, the AF evaluation value obtained after the lens moves the preset distance is calculated, and the above steps are repeated until the lens moves to the other end of the focus range. At last, the lens moves back to the position where the photographic module has greatest AF evaluation value.

However, the number of sampling times needed in the method is in inverse proportion to the moving distance of the lens every time. That is, the less the moving distance of the lens is, the more the number of sampling times is, and the higher the accuracy of focus is, but the lens needs a longer focus time. On the contrary, if the focus time of the lens is decreased, the number of the sampling times of focus is certainly decreased, and the moving distance of the lens is greater, which causes that the optimum focus position of the lens cannot be sampled.

BRIEF SUMMARY OF THE INVENTION

The objective of the invention is to provide a method for automatically focusing in a photographic module which uses less number of focus sampling times and sampling time to achieve the objective of making the photographic module focus accurately.

Another objective of the invention is to provide an electronic device has an advantage of focusing rapidly and clearly with less number of focus sampling times and sampling time.

To achieve the above or other objectives, the invention provides a method for automatically focusing in a photographic module, and the focus action thereof has two stages. In the first stage, a photographic module and a controller electrically connected to the photographic module are provided. When the lens group of the photographic module is provided at the original position, the controller calculates a first AF evaluation value of the photographic module. Then, the lens group moves twice toward a first direction by a first distance, wherein every time the lens moves, the controller calculates a first AF evaluation value of the photographic module. The controller determines via the difference value between two sequential first AF evaluation values and controls the moving direction of the lens group according to the determining result. Afterwards, the lens group continues to move toward the moving direction determined by the controller by the first distance, and the controller continues to calculate the first AF evaluation value. When the first AF evaluation value rises prior and falls later, and the difference value is greater than a preset value, the first stage ends, and the second stage begins. The moving direction of the lens group in the second stage is a direction which is opposite to the moving direction in the first direction, and the Fibonacci search method is utilized to make a more accurate search for the greatest AF evaluation value. After the Fibonacci search algorithm is finished, the accurate focus can be achieved.

In one embodiment of the invention, the step of calculating a plurality of first AF evaluation values via the moving positions of the lens group of the photographic module toward the first direction includes the following steps. First, when the lens group of the photographic module is provided at an original position, the controller calculates a first AF evaluation value. Then, the lens group moves toward the first direction by a first distance many times, and every time the lens group moves, the controller calculates a first AF evaluation value of the photographic module.

In one embodiment of the invention, the step of controlling the moving direction of the lens group according to the calculated first AF evaluation value is performed by controlling the moving direction of the lens group by the controller via a difference value between two sequential first AF evaluation values.

In one embodiment of the invention, when three sequential first AF evaluation values increase, the controller controls the lens group to continue to move toward the first direction.

In one embodiment of the invention, when three sequential first AF evaluation values increase prior and decrease later, the controller controls the lens group to move toward the second direction, and the second direction is opposite to the first direction.

The invention further provides an electronic device which is suitable to focus according to the method for automatically focusing in a photographic module. The electronic device includes a photographic module and a controller. The photographic module includes a lens group and an actuator connected to the lens group, wherein the actuator is used to drive the lens group to move. The controller is electrically connected to the actuator and is used to drive the moving direction of the lens group by the actuator. The controller stores a program code for executing the steps of calculating a plurality of first AF evaluation values via the moving position of a lens group of the photographic module toward the first direction, and controlling the moving direction of the lens group according to the plurality of first AF evaluation values, calculating a plurality of second AF evaluation values via the moving position of the lens group toward a second direction, and when three sequential second AF evaluation values increase prior and decrease later, calculating a focus position by a Fibonacci search algorithm.

In one embodiment of the invention, the program code is used for executing the step of making the controller calculate the first AF evaluation value when the lens group of the photographic module is provided at an original position.

In one embodiment of the invention, the program code is used for executing the step of making the lens group move toward the first direction by a first distance many times, wherein every time the lens group moves, the controller calculates the first AF evaluation value of the photographic module.

In one embodiment of the invention, the program code is used for executing the step of making the controller control the moving direction of the lens group according to two sequential first AF evaluation value.

In one embodiment of the invention, the program code is used for execute the step of making the controller control the lens group to continue to move toward the first direction when three sequential first AF evaluation values increase.

In one embodiment, the program code is used for executing the step of making the controller control the lens group to move toward the second direction which is opposite to the first direction when three sequential first AF evaluation values increase prior and decrease later.

In one embodiment of the invention, the actuator includes the voice coil motor, the stepper motor or piezoelectric assembly.

The method for automatically focusing in a photographic module and the electronic device using the method for automatically focusing in a photographic module in the invention use less number of sampling times of the lens group to achieve the objective of focusing rapidly and accurately and making the electronic device have a good imaging quality.

In the invention, the lens group continues to move toward the determined moving direction by a first distance, and the controller continues to calculate the AF evaluation value. When the AF evaluation value rises prior and falls later, and the difference value is greater than a preset value, the first stage ends, and the second stage begins. In the second stage, the moving direction of the lens group is opposite to the moving direction of the first stage, and the Fibonacci search method is utilized to make a more accurate search for the greatest AF evaluation value. After the Fibonacci search algorithm is finished, the accurate focus can be obtained.

These and other features, aspects, and advantages of the present invention will become better understood with regard to the following description, appended claims, and accompanying drawings.

DETAILED DESCRIPTION OF THE EMBODIMENTS

Figure 1:
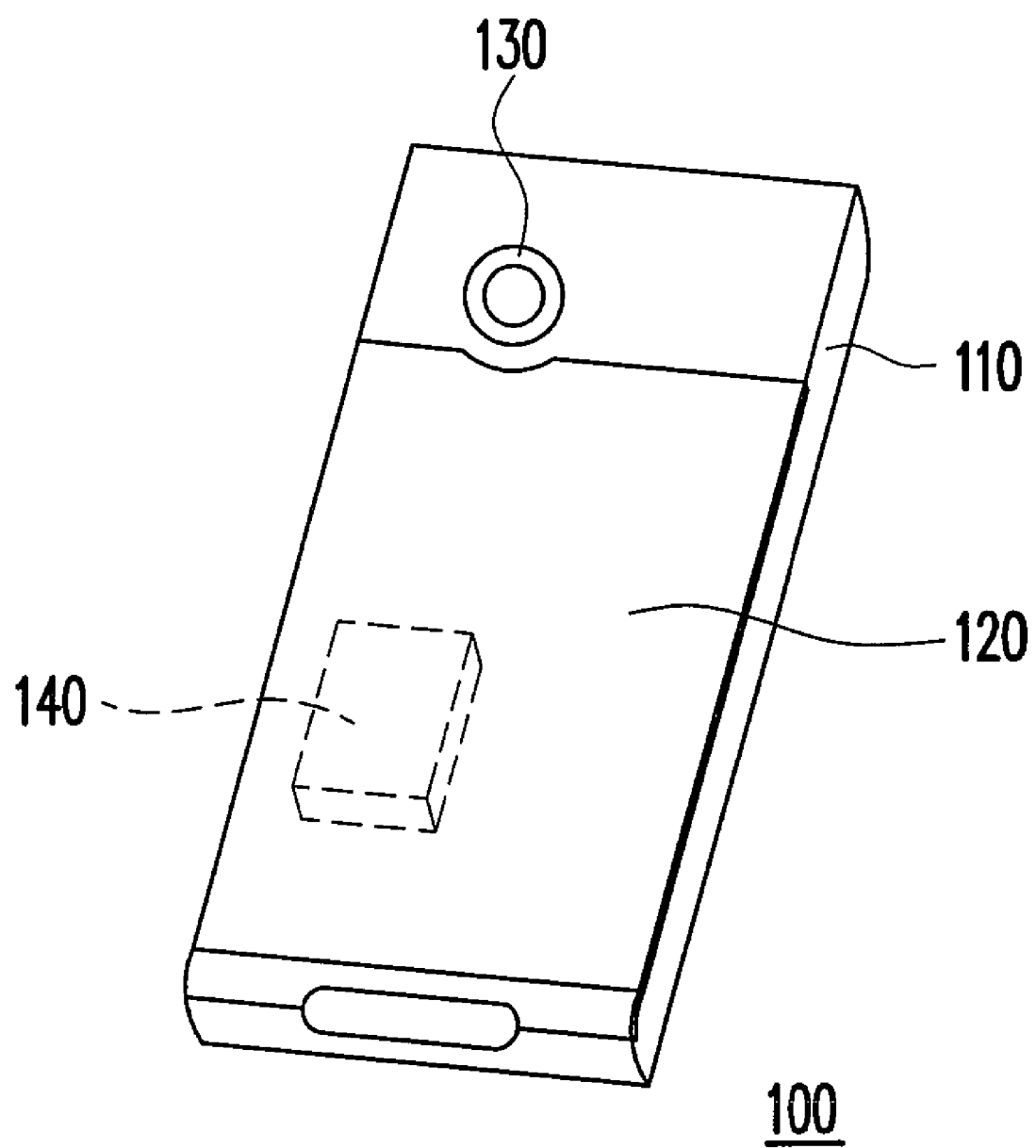
FIG. 1 is a schematic diagram showing an electronic device according to an embodiment of the invention.
Figure 2:
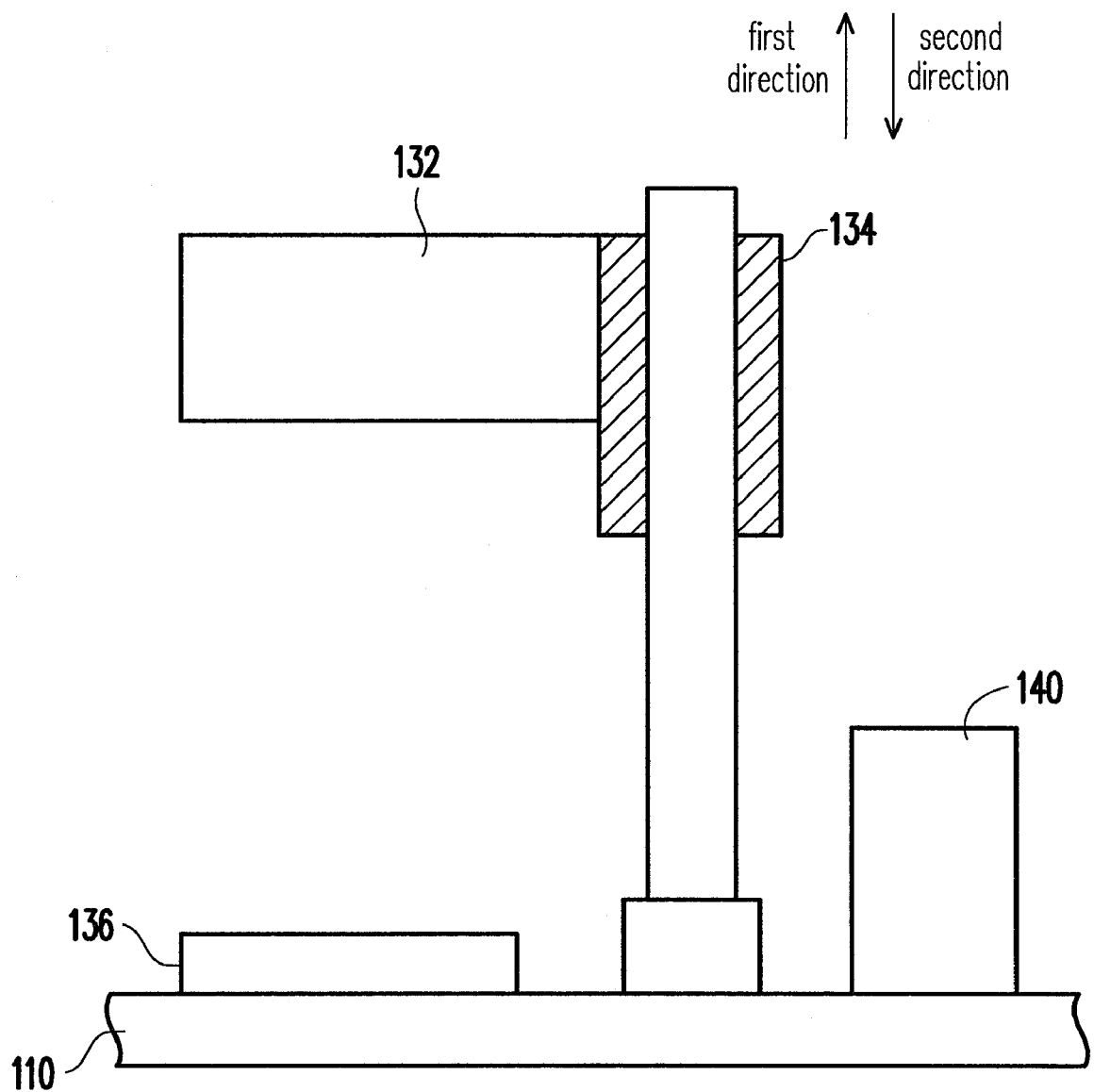
FIG. 2 is a partial section diagram showing the electronic device in FIG. 1.

FIG. 1 is a schematic diagram showing an electronic device according to an embodiment of the invention, while FIG. 2 is a partial section diagram showing the electronic device in FIG. 1. Please refer to FIG. 1 and FIG. 2. The electronic device 100 in the invention can be a mobile phone, a personal digital assistant (PDA) or a notebook with a photographing function. In the embodiment, the mobile phone is taken as example. The electronic device 100 includes a first housing 110, a second housing 120, a photographic module 130 and a controller 140. The first housing 110 is suitable to be connected to the second housing 120, and the photographic module 130 is provided between the first housing 110 and the second housing 120. The photographic module 130 includes a lens group 132, an actuator 134 and a photosensitive assembly 136. The lens group 132 is provided on the second housing 120, and the actuator 134 is also provided on the second housing 120 and is connected to the lens group 132, wherein the actuator 134 drives the lens group 132 to move. The photosensitive assembly 136 is provided between the lens group 132 and the first housing 110 and is suitable to sense light to form an image. The controller 140 is provided between the first housing 110 and the second housing 120 and at one side of the photographic module 130 and is electrically connected to the actuator 134. The controller 140 of the embodiment stores a program code and is suitable to control the moving direction of the lens group 132 via the actuator 134 according to the program code.

To make the spirit of the invention understood better and make the invention implemented, the process of making the photographic module automatically focus by the electronic device according to the program code stored in the controller is described in detail herein below.

Figure 3:
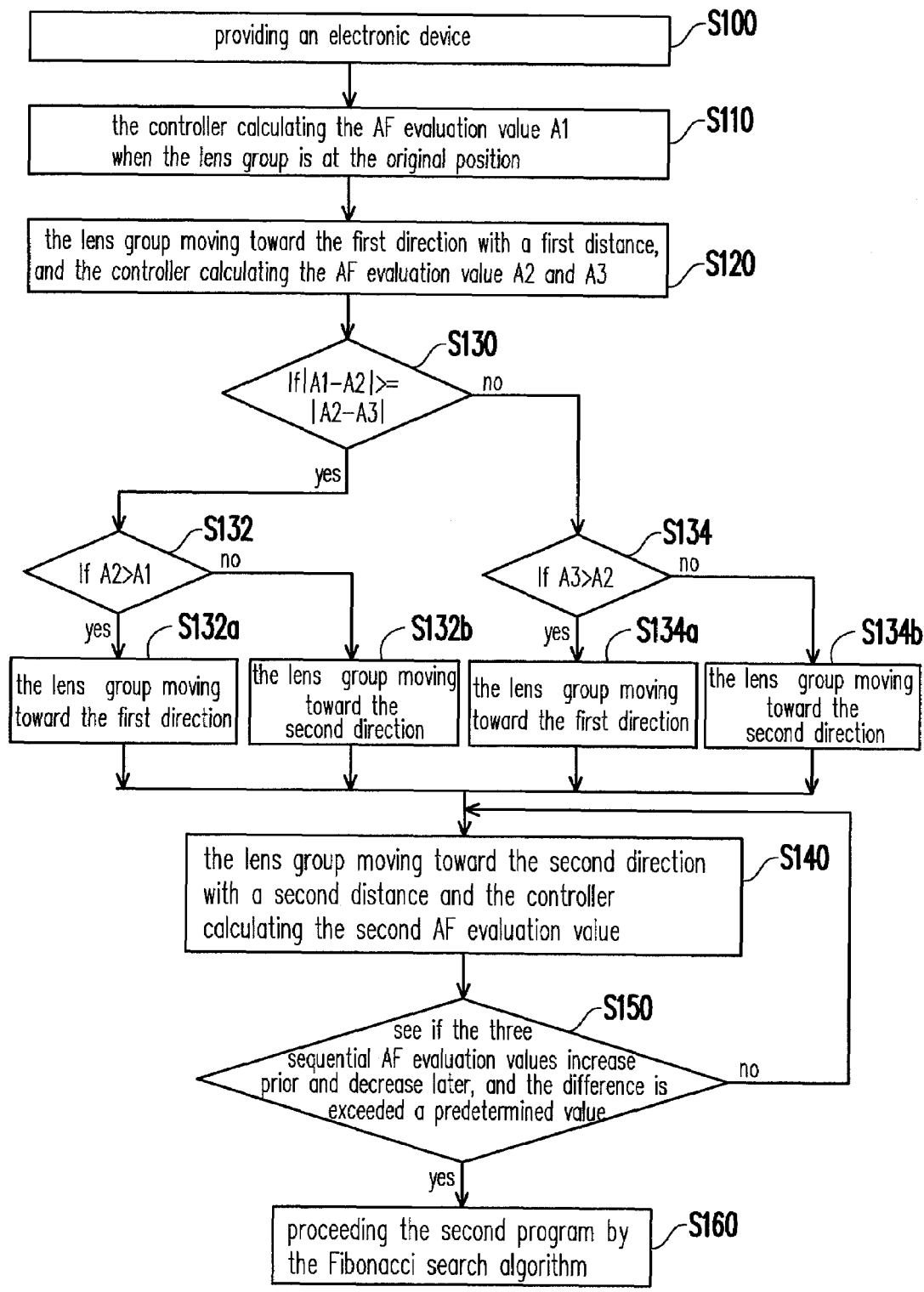
FIG. 3 is a flowchart showing the method for automatically focusing in a photographic module of the electronic device according to the embodiment of the invention.

FIG. 3 is a flowchart showing the method for automatically focusing in a photographic module of the electronic device in the embodiment. Please refer to FIG. 1, FIG. 2 and FIG. 3. First, as shown in the step S100, the electronic device 100 is provided. Then, as shown in the step S110, when the lens group 132 of the photographic module 130 of the electronic device 100 is still provided at the original position, the controller 140 calculates the AF evaluation value A1 of the photographic module 130. Afterward, as shown in the step S120, the actuator 134 drives the lens group 132 to move toward the first direction by a first distance, while after the lens group 132 moves a first distance, the controller 140 calculates the AF evaluation value A2 of the photographic module 130 which moves first time. Then, the controller 140 calculates the difference value D1 between the AF evaluation value A2 and the AF evaluation value A1.

The, the step S120 is repeated, the controller 140 calculates the AF evaluation value A3 of the photographic module 130 which moves second times and the difference value D2 between the AF evaluation value A3 and the AF evaluation value A2.

Then, as shown in the step S130, after the controller 140 obtains the three AF evaluation values A1, A2 and A3 of the photographic module 130, the controller 140 controls moving direction of the lens group 132 according to the determining result according to the absolute values of difference values D1 and D2 of the sequential AF evaluation values.

As stated above, when the absolute value of the difference value D1 is greater than or equal to the absolute value of the difference value D2, the controller 140 determines whether the AF evaluation value A2 is greater than the AF evaluation value A1, as shown in the step S132. When the AF evaluation value A2 is greater than the AF evaluation value A1, as show in the step S132a, the controller 140 controls the lens group 132 to continue to move toward the first direction by the first distance via the actuator 134.

Figure 4:
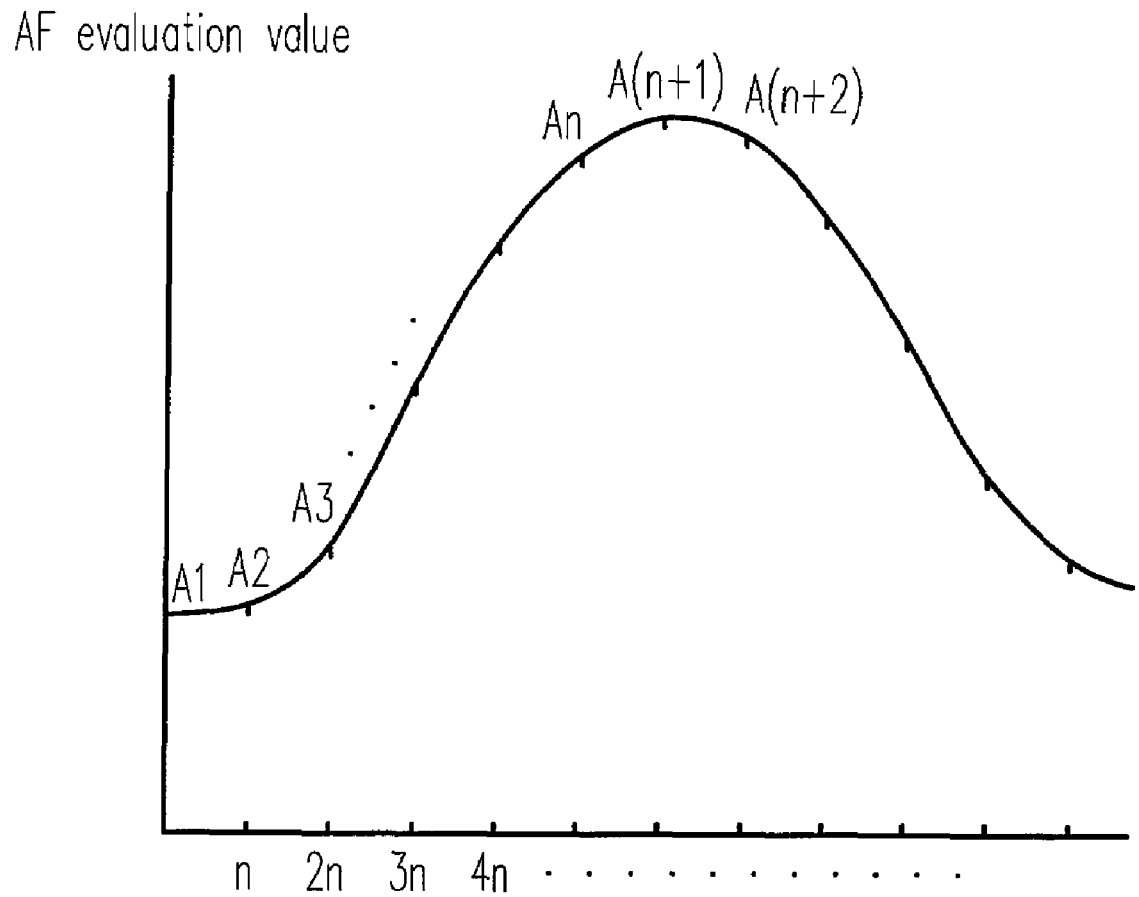
FIG. 4 is a relationship diagram showing the relationship between the AF evaluation value and the moving distance of the lens group.

FIG. 4 is a relationship diagram showing the relationship between the AF evaluation value and the moving distance of the lens group. Please refer to FIG. 3 and FIG. 4. As shown in the step S140, the actuator 134 drives the lens group 132 to move toward the second direction with a second distance and utilizes the controller 140 to calculate the second AF evaluation value until the controller 140 obtains three sequential AF evaluation values An, A(n+1) and A(n+2) which increase prior and decrease later, and the difference values D(n+1) and D(n+2) are greater than a preset value, which is shown in the step S150, and then the focus in the first stage of the lens group 132 is finished, and the lens group does not move toward the first direction with the first distance.

Then, the controller 140 controls the moving direction of the lens group 132. In brief, the focus in second stage of the photographic module 130 is performed. In the embodiment, the controller 140 controls the lens group 132 to move toward a second direction which is opposite the first direction via the actuator 134 to perform the focus in the second stage. Specifically, since the three sequential AF evaluation values An, A(n+1) and A(n+2) increase prior and decrease later, the greatest AF evaluation value is in the focus interval An~A(n+2). At last, as shown in the step S160, by the Fibonacci search algorithm, the lens group 132 can obtain an accurate focus position where the image can be imaged on the photosensitive assembly 146 clearly in the focus interval An~A(n+2), and then the electronic device 100 can have a good image quality.

As state above, when the focus in the first stage of the photographic module 130 is performed, the lens group 132 moves by a greater first distance to find out the focus interval An~A(n+2). Then, in the focus of the second stage, the lens group 132 obtains accurate focus position for the lens group 132 in the focus interval An~A(n+2) by the Fibonacci search algorithm. Therefore, the objective of focusing accurately with less number of sampling times and sampling time can be achieved by using the electronic device and the method for automatically focusing in a photographic module of the embodiment.

Please refer to FIG. 2, FIG. 3 and FIG. 4. When the AF evaluation value A2 is less than the AF evaluation value A1, as shown in the step S132b, the controller 140 controls the lens group 132 to move toward a second direction which is opposite to the first direction with a first distance via the actuator.

Then, the step S140 is repeated many times until the controller 140 obtains three sequential AF evaluation values An, A(n+1) and A(n+2) which increase prior and decrease later, and the difference values D(n+1) and D(n+2) are greater than a preset value, which is shown in the step S150, and then the focus of the first stage of the lens group 132 is finished, the lens group 132 does not move toward the second direction with the first distance.

Then, as shown in the step S160, the focus in the second stage of the photographic module 130 is performed by the Fibonacci search algorithm. It is the same with the above situation that the AF evaluation value A2 is greater than the AF evaluation value A1, since three sequential AF evaluation values An, A(n+1) and A(n+2) increase prior and decrease later, the greatest AF evaluation value is in the focus interval An~A(n+2). The lens group 132 obtains an accurate focus position where the image can be imaged on the photosensitive assembly 146 clearly in the focus interval An~A(n+2) by the Fibonacci search algorithm.

Please go on referring to FIG. 2, FIG. 3 and FIG. 4, when the absolute value of the difference value D1 is less than the absolute value of the difference value D2, as shown in the step S134, the controller 140 continues to determine whether the AF evaluation value A3 is greater than the AF evaluation value A2. When the AF evaluation value A3 is greater than the AF evaluation value A2, the controller 140 controls the lens group 132 to continue to move toward the first direction by a first distance via the actuator 134, which is shown in the step S134a.

The step S140 is repeated many times until the controller 140 obtains three sequential AF evaluation values An, A(n+1) and A(n+2) which increase prior and decrease later, and the difference values D(n+1) and D(n+2) are greater than a preset value, which is shown in the step S150, and then the focus of the first stage in the lens group 132 is finished, and the lens group 132 does not move to the first direction by the first distance.

Then, as shown in the step S160, the controller 140 controls the lens group 132 to perform the focus in the second stage. In the embodiment, controller 140 controls the lens group 132 to move via the actuator 134 by the Fibonacci search algorithm, so that the lens group 132 can obtain the accurate focus position where the image can be imaged on the photosensitive assembly 146 clearly in the focus interval An~A(n+2).

Please refer to FIG. 2, FIG. 3 and FIG. 4, when the AF evaluation value A3 is less than the AF evaluation value A2, as shown in the step S134b, the controller 140 controls the lens group 132 to move toward the second direction which is opposite to the first direction by the first distance via the actuator 134.

Afterwards, the step S140 is repeated many times until the controller 140 obtains three sequential AF evaluation values An, A(n+1) and A(n+2) which increase prior and decrease later, and the difference values D(n+1) and D(n+2) are greater than a preset value, which is shown in the step S150. At this time, the focus in the first stage of the lens group 132 is finished, and the lens group does not move toward the second direction by the first distance.

Then, the controller 140 controls the moving direction of the lens group 132 to perform the focus in the second stage of the photographic module 130. In the embodiment, the controller 140 utilizes the Fibonacci search algorithm and controls the lens group 132 to perform the focus in the second stage via the actuator 134, so that the lens group 132 can obtain an accurate focus position where the image can be imaged on the photosensitive assembly 146 clearly in the focus interval An~A(n+2).

To sum up, the method for automatically focusing in a photographic module of the invention obtains the focus interval having the greatest AF evaluation value of the photographic module by a greater focus distance, and finding out the accurate focus position by the Fibonacci search algorithm. Therefore, the method for automatically focusing in a photographic module and the electronic device using the method for automatically focusing in a photographic module of the invention has at least following advantages.

The number of sampling times in moving the lens group is less, and the focus time of the lens group is also reduced.

The accurate focus position of the lens group can be obtained to make the electronic device have a good imaging quality.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for automatically focusing in a photographic module, the method comprising the steps of:
    calculating a plurality of first automatic focus (AF) evaluation values according to the moving position of a lens group of the photographic module toward a first direction;
    controlling the moving direction of the lens group according to the plurality of the first AF evaluation values;
    calculating a plurality of second AF evaluation values according to the moving position of the lens group toward a second direction; and
    calculating a focus position of the lens group by a Fibonacci search method when three sequential second AF evaluation values of the plurality of second AF evaluation values increase prior and decrease later.

2. The method for automatically focusing in a photographic module according to claim 1, wherein the step of calculating the plurality of first AF evaluation values according to the moving position of the lens group of the photographic module toward the first direction comprises the steps of:
    calculating the first AF evaluation value via a controller when the lens group of the photographic module is provided at an original position; and
    making the lens group move toward the first direction with a first distance a plurality of times, wherein every time the lens group moves, the controller calculates one of the plurality of first AF evaluation values of the photographic module.

3. The method for automatically focusing in a photographic module according to claim 1, wherein the method further comprises the step of achieving the step of controlling the moving direction of the lens group by the controller according to a difference value between two sequential first AF evaluation values of the plurality of first AF evaluation values.

4. The method for automatically focusing in a photographic module according to claim 1, wherein when three sequential first AF evaluation values of the plurality of first AF evaluation values increase, the controller controls the lens group to continue to move toward the first direction.

5. The method for automatically focusing in a photographic module according to claim 1, wherein when three sequential first AF evaluation values of the plurality of first AF evaluation values increase prior and decrease later, the controller controls the lens group to move toward the second direction which is opposite to the first direction.

6. An electronic device which is suitable to focus according to a method for automatically focusing in a photographic module, the electronic device comprising:
    a photographic module further comprising:
        a lens group;
        an actuator connected to the lens group, wherein the actuator is used to drive the lens group to move;
        a controller electrically connected to the actuator and used to drive the moving direction of the lens group via the actuator, wherein the controller stores a program code, and the program code is used to execute the steps of:
            calculating a plurality of first automatic focus (AF) evaluation values according to the moving position of a lens group of the photographic module toward a first direction;
            controlling the moving direction of the lens group according to the plurality of first AF evaluation values;
            calculating a plurality of second AF evaluation values according to the moving position of the lens group toward a second direction; and
            calculating a focus position of the lens group by a Fibonacci search algorithm when three sequential second AF evaluation values of the plurality of second AF evaluation values increase prior and decrease later.

7. The electronic device according to claim 6, wherein the program code is used to execute the step of calculating the first AF evaluation value by the controller when the lens group of the photographic module is provided at an original position.

8. The electronic device according to claim 6, wherein the program code is used to execute the step of making the lens group move toward the first direction by a first distance a plurality of times, and making the controller calculate the first AF evaluation value of the photographic module every time the lens group moves.

9. The electronic device according to claim 6, wherein the program code is used to execute the step of achieving the step of controlling the moving direction of the lens group by the controller according to a difference value between two sequential first AF evaluation values of the plurality of first AF evaluation values.

10. The electronic device according to claim 6, wherein the program code is used to execute the step of making the controller control the lens group to continue to move toward the first direction when three sequential first AF evaluation values of the plurality of first AF evaluation values increase.

11. The electronic device according to claim 6, wherein the program code is used to execute the step of making the controller control the lens group to move toward the second direction which is opposite to the first direction when three sequential first AF evaluation values of the plurality of first AF evaluation values increase prior and decrease later.

12. The electronic device according to claim 6, wherein the actuator comprises a voice coil motor, a stepper motor or a piezoelectric assembly.

* * * * *